C. M. AND H. BECKER.
CANDY MAKING MACHINE.
APPLICATION FILED MAY 10, 1920.
1,369,772.
Patented Mar. 1, 1921.
3 SHEETS—SHEET 1.
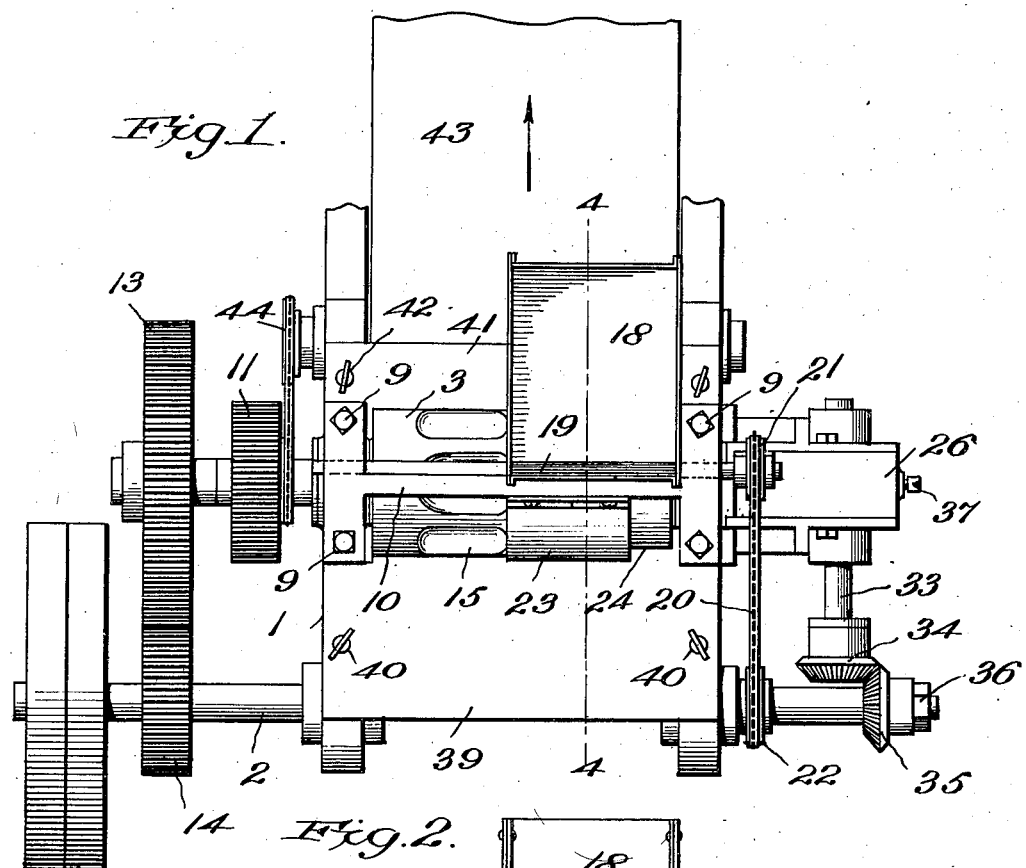
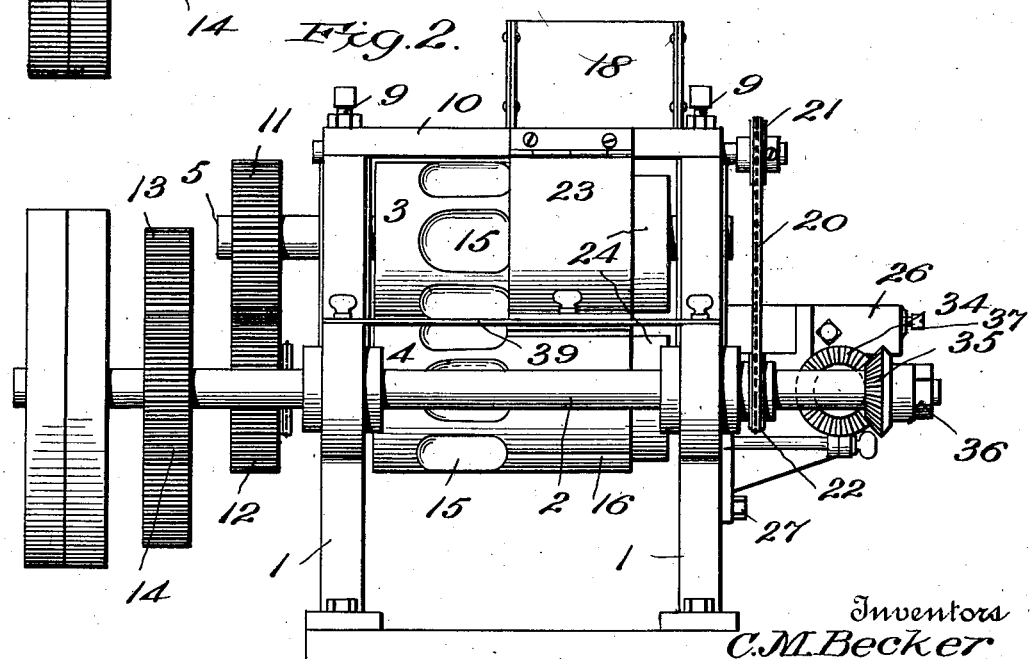

C. M. AND H. BECKER.
CANDY MAKING MACHINE.
APPLICATION FILED MAY 10, 1920.

1,369,772.

Patented Mar. 1, 1921.
3 SHEETS—SHEET 2.

Inventors
C. M. Becker
H. Becker
By their Attorney
Geo. A. Byrne.

C. M. AND H. BECKER.
CANDY MAKING MACHINE.
APPLICATION FILED MAY 10, 1920.

1,369,772.

Patented Mar. 1, 1921.

Inventors
C. M. Becker
H. Becker
By their Attorney Geo. A. Byrne

UNITED STATES PATENT OFFICE.

CHARLES M. BECKER AND HERMAN BECKER, OF BROOKLYN, NEW YORK.

CANDY-MAKING MACHINE.

1,369,772.     Specification of Letters Patent.     Patented Mar. 1, 1921.

Application filed May 10, 1920. Serial No. 380,044.

*To all whom it may concern:*

Be it known that we, CHARLES M. BECKER and HERMAN BECKER, citizens of the United States, and residents of Brooklyn, in the county of Kings and State of New York, have invented certain new and useful Improvements in Candy-Making Machines, of which the following is a specification.

This invention relates to candy making machines and has particular reference to a machine for molding or making small pieces of candy generally known as "lolly pops."

The general object of the invention is to provide a machine of this type which may be readily assembled and taken apart so that it may be used during the different seasons of the year for the formation of various other pieces of candy generally made in the candy factory.

Another object of the invention is to provide a relatively cheap and substantial machine of this type wherein the lumps are rapidly molded from a mass of material, and the sticks forced therein while the machine is operating at a continuous and uniform speed.

And to these ends the invention consists in the novel details of construction and combination of parts more fully hereinafter described and particularly pointed out in the claims.

Referring to the drawings forming a part of this specification, in which like numerals designate like parts in all the views—

Figure 1 is a top plan view of the machine.

Fig. 2 is an end view of the machine.

In the form of machine herein illustrated, 1 designates a suitable frame in the front end of which is mounted, in suitable bearings, the main drive shaft 2, which may be driven from any suitable source of power, such as from an electric motor or otherwise.

Figure 5:
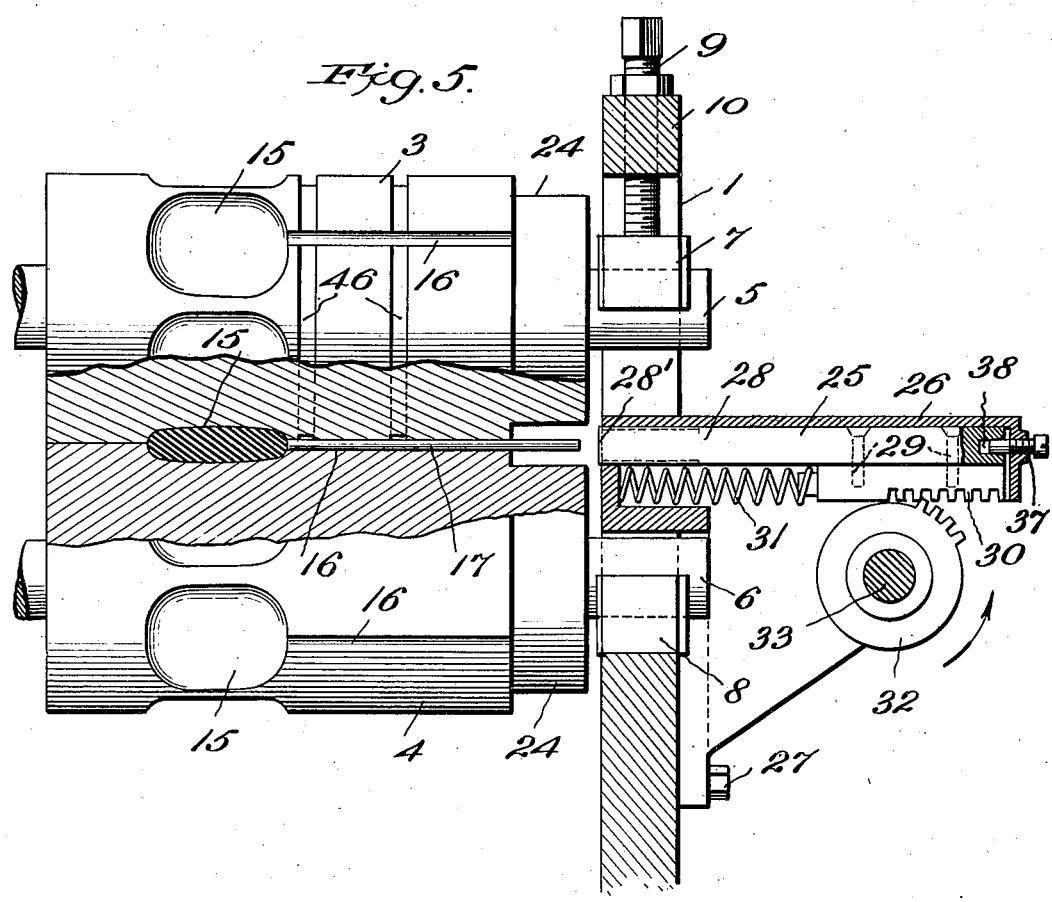
Fig. 5 is an enlarged detail fragmentary cross-sectional view of a portion of the machine.

A pair of rolls 3 and 4 have their shafts 5 and 6 journaled in suitable bearings 7 and 8 which are mounted in the slotted side portions of the machine. These rolls are held in contact with each other by means of the adjusting screws 9 which are mounted in the cross bar 10 and engage the bearings 7 of the upper roll 3, as shown. By means of these adjusting screws it is obvious that the rolls are always held in proper relation to each other, and it is also obvious that the rolls may be readily removed and replaced from time to time, after the cross bar 10 has been removed from the upper part of the frame. The rolls are arranged to be driven in perfect unison and in opposite direction by a suitable train of gearing 11, 12, 13 and 14, the latter of which is fast upon the main drive shaft 2. Both of the rolls are provided on their peripheral portions with the mold cavities 15 adapted to register in order to produce a piece of candy of the desired shape, as clearly shown in Fig. 5. The cavities are preferably of an oval shape and are arranged on one end of the rolls as shown, the remaining portion of the rolls being provided with longitudinal grooves 16 of substantially semi-circular shape in cross section. These grooves are provided for receiving the stick or rods 17 which are to be assembled with the candy piece during the operation of the machine.

The sticks are fed to the grooves from a hopper 18 which is suitably and detachably secured to the cross bar 10, as shown. Any suitable number of sticks may be carried by the hopper and by means of a small roller 19 journaled in the sides of the machine and passing through the hopper, at its lower end, the sticks are kept in proper position to be fed to the upper roll one at a time, as clearly shown in Fig. 4. By means of a chain 20 passing over a sprocket 21 mounted on the end of the roller shaft and over a sprocket 22 mounted on the main drive shaft 2, the roller 19 is driven at a relatively slow rate of speed.

To prevent the sticks from falling from the grooves in the upper roll after they have been deposited therein, a guard or shield 23 is provided. This guard is hingedly connected to the cross bar 10, and is arranged so that it may be swung upwardly and away from the upper roll should occasion require. As the rolls revolve and a pair of the grooves 16 come into register, the stick carried down by the upper roll will obviously fall into the groove of the lower roll, and at this moment the stick is forced or driven into the candy piece held between the cavities 15 which have also been brought into register. One end of each of the rolls is reduced, as indicated at 24, for the purpose of permitting the end of the plunger 25 to enter between the rolls to force the stick into the candy as clearly shown in Fig. 5.

Figure 6:
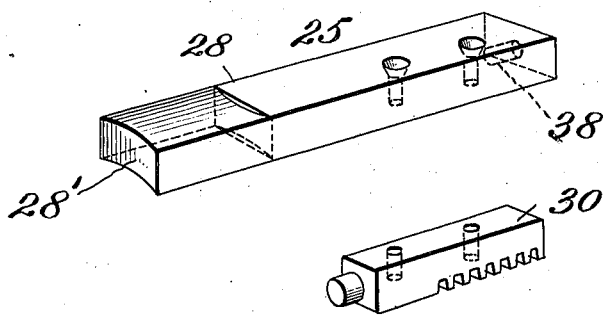
Fig. 6 is a detail perspective view of the plunger and rack, the parts shown separated.

The plunger 25 is suitably mounted to reciprocate in a housing or casing 26 secured by means of the bolts 27 to the frame of the machine opposite the ends of the rolls and in such position as to cause the plunger to operate in axial alinement with the grooves 16 when they are brought into register. The plunger is so timed and arranged that when one of the sticks carried by the groove 16 just reaches the point opposite the plunger, the plunger will be operated thus forcing the stick into the candy which has just been molded. The plunger as shown comprises a rectangular and elongated piece 28, to the under side of one end portion of which is detachably secured, as by means of the screws 29, a rack 30. It will be noted that the forward end of the plunger which contacts with the stick is curved, as shown at 28', in Fig. 6. Actual practice has proven this to be a very important feature in preventing the sticks from breaking when they are driven into the candy. A coil spring 31, one end of which bears against a rack and the other end of which bears against a portion of the casing 26, is provided to move the plunger backward suddenly, withdrawing it from contact with the stick and from its position between the rolls after it has been moved forward. By means of a segmental gear 32 mounted on a shaft 33 and engaging the rack, the plunger is intermittently actuated at the proper time. The shaft 32 is mounted in suitable bearings carried by the casing 26 and by means of a bevel gear 34 mounted on the end of the shaft 32 and meshing with a bevel gear 35 mounted on the main drive shaft 2, the shaft 32 is revolved at its proper rate of speed. A nut 36 is provided for holding the bevel gear 35 on the main shaft 2, and it is obvious that when it is desired to throw the plunger mechanism out of operation it is necessary only to remove the nut and gear so the mechanism cannot operate.

To silence the noise made by the plunger when returned to its initial position by means of the spring, a pneumatic cushion is provided. This cushion is formed by mounting a screw 37 in the end of the casing 26, which screw has its inner end projected into the casing and arranged so as to enter an opening 38 provided in the end of the plunger when the plunger is returned to its initial position.

Figure 4:
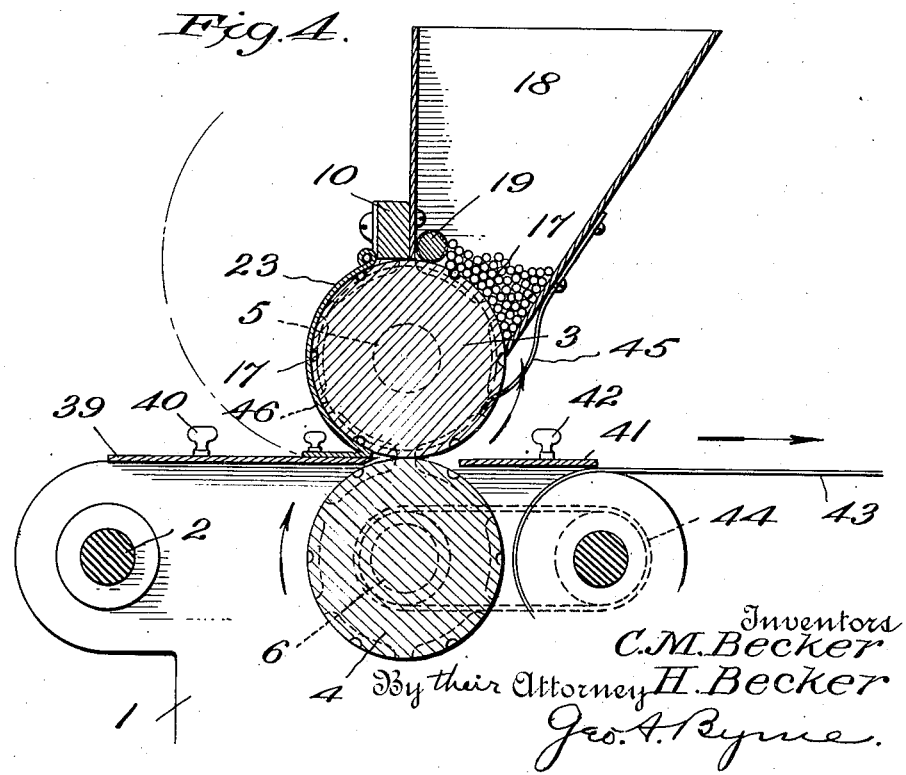
Fig. 4 is a longitudinal sectional view of the machine taken on the line 4—4 of Fig. 1.

39 designates a table removably secured, by means of the thumb nuts 40, to the side of the frame, as shown, and over this table a strip of candy is guided to the rolls by the operator. The candy is forced between the rolls and molded to the desired shape and the sticks secured therein. As the assembled pieces leave the rolls, they are delivered upon another table 41 which is also removably secured, by means of the thumb nuts 42, to the sides of the frame of the machine. The finished pieces slide along the table 41 and are delivered onto an endless conveyer 43 which is preferably long enough so that the pieces resting thereon will be sufficiently cooled and hardened before they reach the end of the conveyer. As shown in Figs. 1 and 4, the conveyer is driven by means of a sprocket and chain connection 44 from the shaft of the lower roll.

Figure 3:
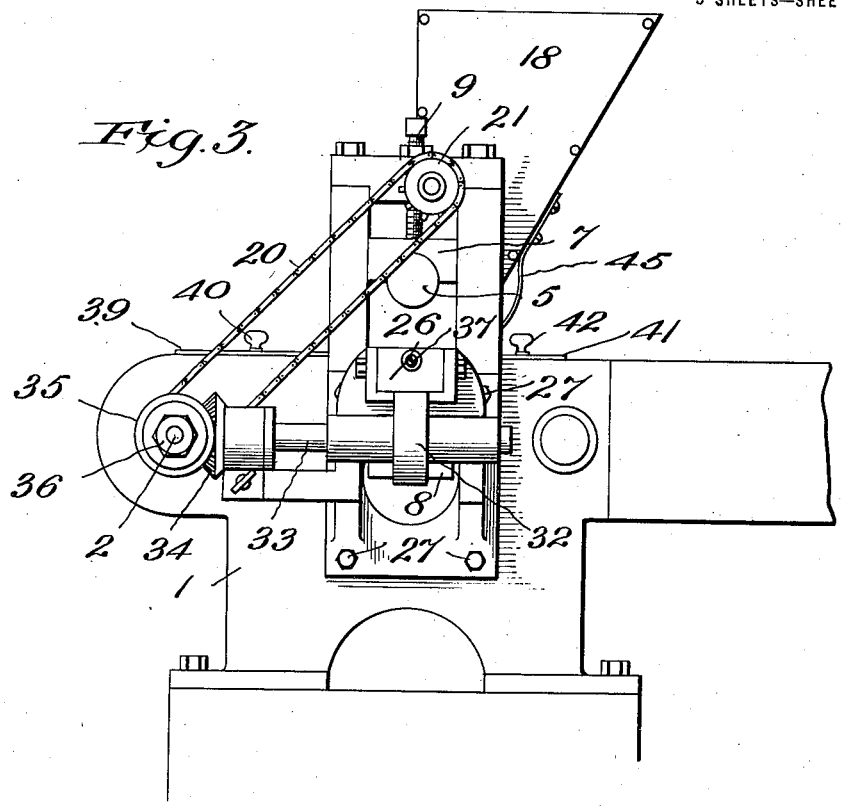
Fig. 3 is a side view of the machine.

To prevent the finished piece from sticking in the upper roll after it has been molded as sometimes occurs, it will be noted, as shown in Figs. 3 and 4, a pair of spring forks 45 is provided. These forks are secured at their upper ends to the rear side of the hopper and have their lower ends projected into a pair of circular grooves 46 formed in the periphery of the upper roll 3. The ends are arranged in the grooves so that they may engage the stick of the finished piece and dislodge it from the mold cavity if it should adhere thereto and direct the piece onto the table 41.

It is obvious that those skilled in the art may vary the details of construction and combination and arrangement of parts without departing from the spirit of our invention, and therefore we do not wish to be limited to such features except as may be required by the claims.

What we claim is—

1. In a candy making machine, the combination of a frame, a main drive shaft mounted on the frame, a pair of rolls journaled in the frame and adapted to rotate against each other and having cavities for forming lumps of candy, said rolls also having companion grooves arranged longitudinally thereof, means for feeding sticks singly into said grooves, a plunger and means including a rack and segmental gear connection operated from said drive shaft for intermittently actuating the plunger to force the sticks into the candy.

2. In a candy making machine the combination of a frame, a pair of rolls journaled in the frame and adapted to rotate against each other and having cavities for forming lumps of candy, said rolls also having companion grooves arranged longitudinally thereof, means for feeding sticks singly into said grooves, a plunger, a rack and segmental gear connection for intermittently operating the plunger in one direction to force the sticks into the candy, and a spring for returning the plunger to its initial position.

3. In a candy making machine the combination of a frame, a pair of rolls journaled in the frame and adapted to rotate against each other, and having cavities for forming lumps of candy, said rolls also having companion grooves arranged longitudinally thereof, means for feeding sticks singly into said grooves, a casing mounted on one side of the frame, a plunger mounted within the casing, a rack mounted on the plunger, a shaft mounted in the casing, a segmental gear mounted on the shaft, and meshing with the rack for intermittently operating the plunger in one direction to force the sticks into the candy and a spring for returning the plunger to its initial position.

4. In a candy making machine the combination of a frame, a pair of rolls journaled in the frame and adapted to rotate against each other, and having cavities for forming lumps of candy, said rolls also having companion grooves arranged longitudinally thereof, means for feeding sticks singly into said grooves, a plunger, means for operating the plunger in one direction to force the sticks into the candy, a spring for returning the plunger to its initial position and means providing a pneumatic cushion for relieving the jar of the plunger when returned to its initial position.

Signed at New York, in the county of New York and State of New York, this 6th day of May, A. D. 1920.

CHARLES M. BECKER.
HERMAN BECKER.